United States Patent [19]

Jenkins

[11] 4,429,767

[45] Feb. 7, 1984

[54] PELLETIZED BRAKE LINING DISC BRAKE

[76] Inventor: Robert L. Jenkins, 545 Yarboro, Bloomfield Hills, Mich. 48013

[21] Appl. No.: 181,147

[22] Filed: Aug. 25, 1980

[51] Int. Cl.³ .............................. F16D 65/52
[52] U.S. Cl. .............................. 188/71.8; 188/71.1; 188/72.6; 188/73.31; 188/196 R; 192/58 B; 192/70.14; 192/111 A
[58] Field of Search ............... 188/71.1, 73.1, 71.8, 188/71.9, 72.1, 72.4, 72.6, 73.31, 250 B, 196 R; 192/58 B, 58 C, 70.14,

[56] References Cited

U.S. PATENT DOCUMENTS

| 2,125,617 | 8/1938 | Niemann | 192/58 B |
| 3,887,042 | 6/1975 | Ditlinger et al. | 188/71.8 |
| 4,182,435 | 1/1980 | Dadian | 188/73.1 X |

FOREIGN PATENT DOCUMENTS

| 684382 | 3/1965 | Italy | 188/72.9 |
| 308697 | 6/1930 | United Kingdom | 192/58 C |
| 638561 | 6/1950 | United Kingdom | 188/72.4 |
| 710690 | 6/1954 | United Kingdom | 188/370 |

Primary Examiner—George E. A. Halvosa
Attorney, Agent, or Firm—Remy J. VanOphem

[57] ABSTRACT

A disc brake assembly utilizing pelletized brake lining material in a toque absorbing chamber is disclosed. The chamber is positioned around and over the disc and radially inward on opposite sides of the disc. The chamber has an internal cavity for the storage of brake lining pellets therein and a mechanism for moving the brake lining pellets against the disc to transfer torque from the disc to the cavity. A mechanism replenishing the brake lining pellets in the cavity of the chamber when at least one of the brake lining pellets is expended is also provided. In the preferred embodiment, a magazine pellet feeder mechanism, coacting with a pawl, feeds the brake lining pellets from a reservoir to the cavity in the chamber. In an alternate embodiment, a screw type pellet feeder mechanism coacts with a pawl to feed the brake lining pellets from a reservoir to the cavity in the chamber.

3 Claims, 9 Drawing Figures

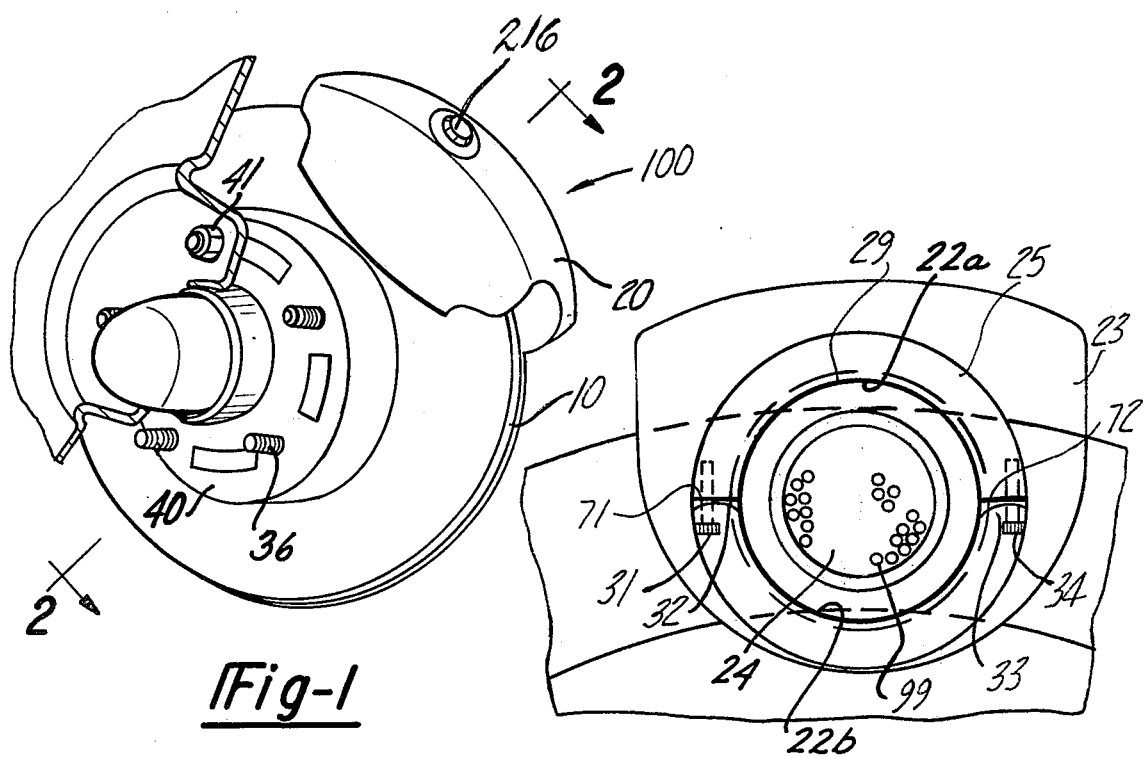
Fig-1
Fig-3
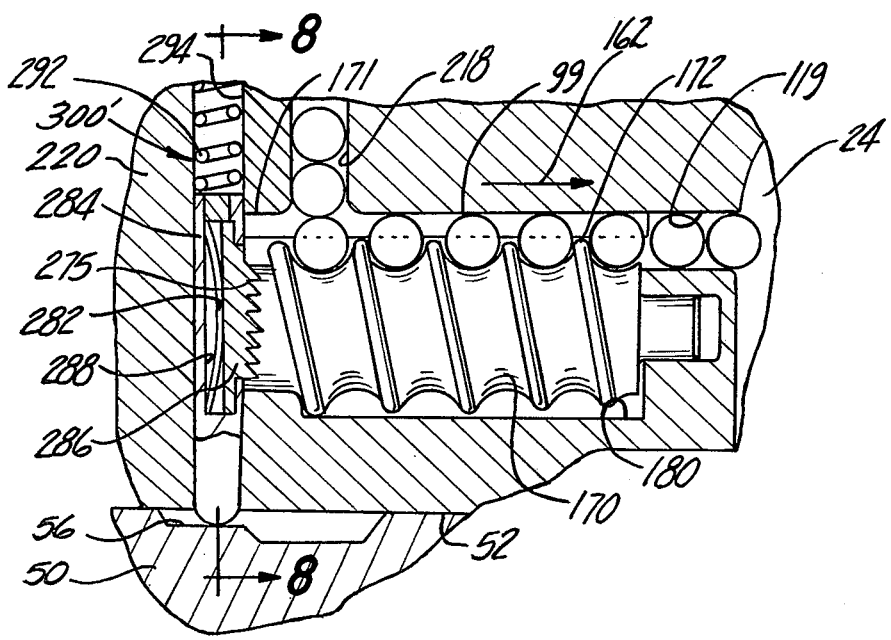
Fig-7

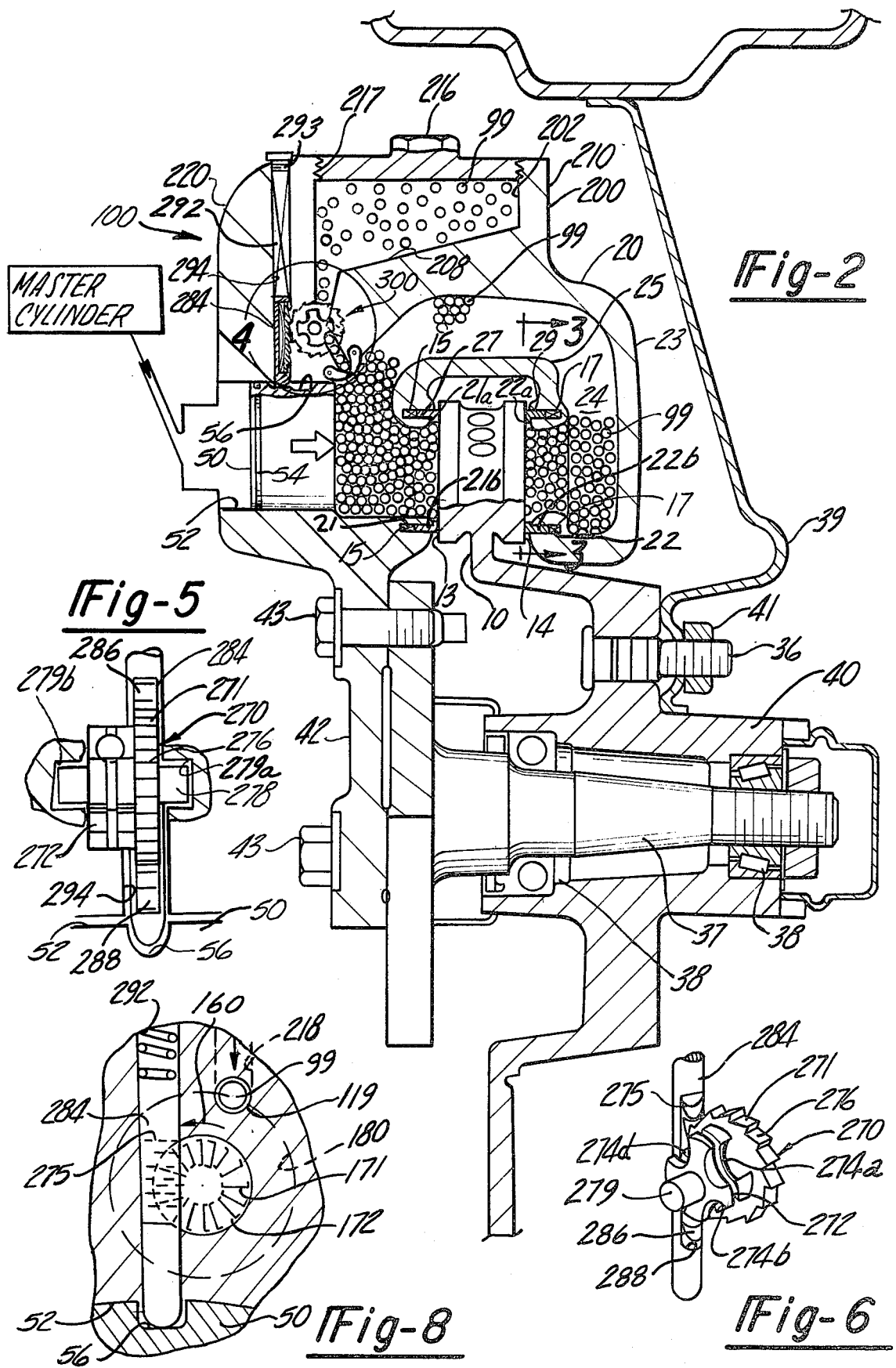

PELLETIZED BRAKE LINING DISC BRAKE

BACKGROUND OF THE INVENTION

1. FIELD OF THE INVENTION

The present invention relates to brake systems. More specifically, it relates to a disc brake system having pelletized brake lining material.

2. DESCRIPTION OF THE PRIOR ART

In prior art disc brake assemblies, generally a C-clamp caliper housing is positioned so as to grip opposite sides of the rotor. The caliper is rigidly anchored to the vehicle to absorb the torque loads while the rotor is fastened to the wheel hub or axle and rotates with it. Pads of friction material, usually metal backed, are floatably mounted to the caliper legs which are actuated when braking is desired to pinch the rotor. The braking friction forces are absorbed by the pads which are restrained by the metal backing and the caliper housing. Brake actuation is normally accomplished through hydraulic slave cylinders whose pistons abut the metal backing of the friction pads.

The disadvantages of the prior art disc brake assemblies are numerous, including a tendency to exhibit uneven lining wear causing squeaky brakes, the floating parts must be free of dirt, and corrosion of the pads can cause the pads to become jammed into a fixed position and thus are unable to float. Other problems include the need for periodic replacement of the pads, the difficulties inherent in attaching an emergency brake to a disc pad brake system, the heavy weight of the assemblies, the difficulties in providing higher friction lining material brake pads to permit increased brake torque absorption without sacrificing brake lining pad life (i.e. for aggressive brake applications) and cost. These disadvantages will be discussed more fully hereinafter.

In disc brake assemblies, the brake pads, when they are brought into frictional contact with the associated disc, must be held against rotation in some manner. That is, the torque forces must be transmitted from the brake pads to a stationary member. If this force is transmitted from either one or both of the brake pads to the actuating caliper assembly and then to an associated stationary member, the caliper assembly, due to tolerance buildup, has a tendency to twist because of misalignment which is caused by the necessary production tolerances between the caliper and the stationary member and due to an inherent deflection of the stationary member itself. The resultant twisting of the caliper will cause uneven lining wear. In many instances, this type of torque-absorbing arrangement may add unnecessary weight to the caliper assembly. In addition, if the brake pads are not free of dirt and corrosion, the pads will not be able to slide freely within the caliper. This will lead to uneven lining wear on the pads causing squeaky or noisy brakes.

Since the brake lining material of the brake pads has a finite thickness, eventually the lining material wears off and the metal backing plate rubs against the disc. This can cause severe damage to the rotor and, in extreme cases, can destroy the rotor. In order to prevent rotor scoring from occurring, periodic inspection and eventual replacement of the brake lining pads is required. In some instances, it has been possible to use modified brake lining compositions to extend the life of the brake lining pads. However, extended life brake lining pads are usually accomplished by a tradeoff of superior friction characteristics for better life. Even with extended life brake lining pads, the periodic inspection and replacement of the brake lining pads is only delayed and replacement of the pads is ultimately required.

Finally, conventional disc brake systems are inherently complex and costly to manufacture due to the close production tolerances required. Another factor adding to the manufacturing costs is the number of associated parts.

To summarize briefly, the disadvantages of the prior art brake disc pad assemblies are as follows: the uneven lining wear; the squeaky and noisy operation; the need for periodic replacement of the pads; the need for the pads to float freely; the heavy weight of the assemblies; the cost and the difficulties of providing higher friction lining material brake pads to permit increased brake torque absorption without sacrificing brake pad life or cost.

SUMMARY OF THE INVENTION

The present invention eliminates the need for frequently replacing brake lining pads and eliminates the problems of uneven brake pad lining wear causing noisy and squeaky brakes. The present invention also permits the use of several brake actuation systems such as mechanical, air, hydraulic, air over hydraulic, electromechanical and electrohydraulic systems. Furthermore, the present design is self-adjusting and self-replenishing and eliminates the need for periodic inspection. Additionally, the present invention is also less prone to malfunction due to contamination from dirt and corrosion. Finally, the invention is simple and inexpensive to make.

In accordance with the present invention, an improved disc brake system is characterized by a rotating brake disc and a nonrotating chamber. The chamber is defined by a controlled shape outer housing and an inner housing which are connected together so as to be spaced from and to extend across the periphery of the disc and to extend radially inward on opposite sides of the disc. The inner and outer housings form a cavity within which at least one aperture is located so as to be perpendicular to the face of the disc. A seal sleeve or collar is fitted around each aperture. Brake lining material in the form of pellets is stored in the cavity. The pellets in the cavity and the collar are moved by a piston against the sides of the rotor so that torque is absorbed from the disc face through the pellets and then to the nonrotating chamber. A undirectional pellet feeder mechanism is mounted on the chamber and continually replenishes the pellets into the cavity as the pellets are spent.

It is a primary object of the invention to provide a disc brake system that is self-centering and self-replenishing. It is an additional object of the invention to eliminate the need for frequent periodic inspection and maintenance of the brake lining pads.

It is another object of the invention to permit the use of higher coefficient friction brake lining material in a brake system without sacrificing brake life or requiring frequent inspections and maintenance.

Another object of the invention is to provide a disc brake system which is compatible with many brake actuation systems and yet is inexpensive to manufacture.

A still further object of the invention is to provide a disc brake system design which features an inherent ability to provide force multiplication by virtue of the ratio of actuating means surface area to the disc brake engaging area.

A still further object of the invention is to provide a mechanism for brake lining pellet replenishment with the additional feature of providing small brake lining material adjustment increments by virtue of its ability to provide a small volume ratio adjustment by providing only one brake lining pellet to the brake lining cavity at a time.

Still another object of the invention is to provide a compact, easily serviceable, reduced weight and less expensive brake system, as compared to conventional disc brake systems.

BRIEF DESCRIPTION OF THE DRAWINGS

FIG. 1 is a perspective view showing a disc brake assembly embodying the invention;

FIG. 2 is a partially schematic sectional view of the disc brake assembly taken generally along lines 2—2 of FIG. 1;

FIG. 3 is a sectional view of the disc brake assembly taken along lines 3—3 of FIG. 2;

FIG. 5 is an end view of FIG. 4;

FIG. 6 is a perspective view of FIG. 5;

FIG. 7 in an enlarged sectional view of an alternate embodiment of the feeder mechanism for the brake lining pellets;

FIG. 8 is a sectional view taken along lines 8—8 of FIG. 7; and

DETAILED DESCRIPTION OF THE PREFERRED EMBODIMENT

Figure 4:
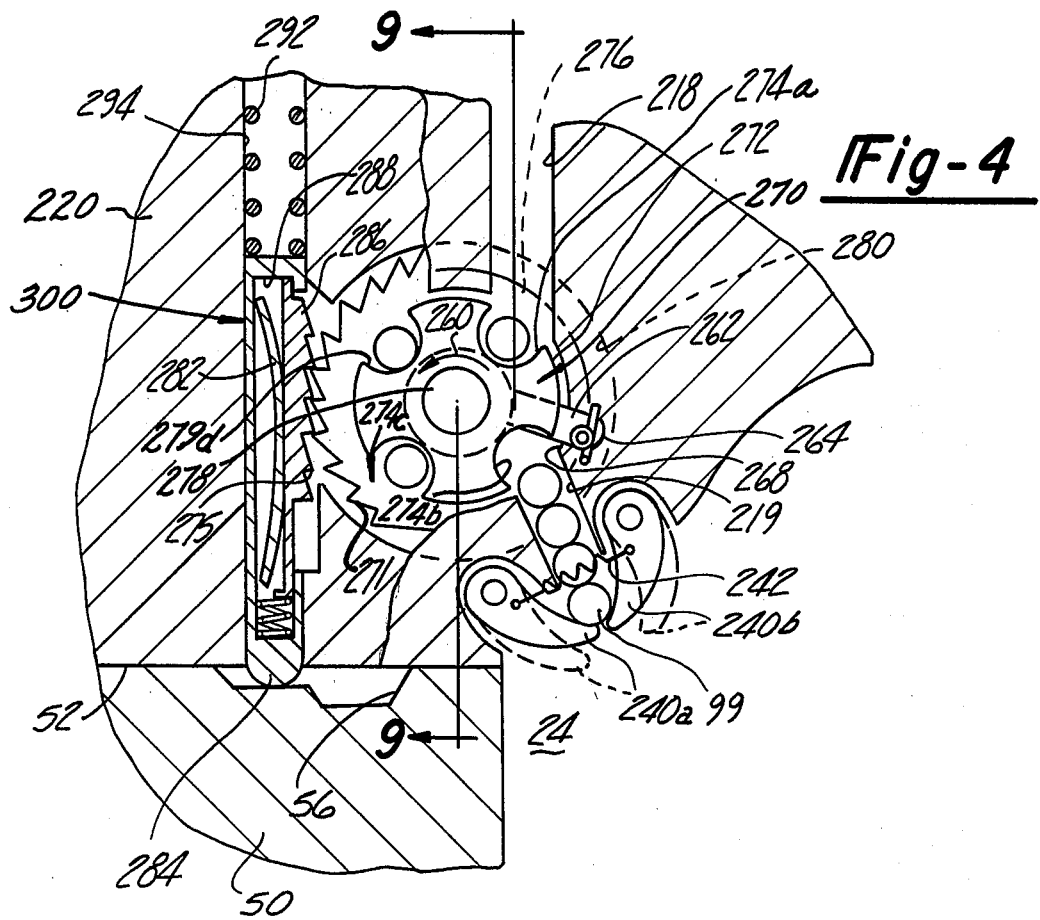
FIG. 4 is an enlarged view of the area encompassed by the circle 4 in FIG. 2 showing the preferred embodiment of the feeder mechanism for the brake lining pellets.

FIG. 1 shows the general environment of the invention. A disc brake assembly embodying the invention is identified generally by the reference numeral 100. The brake assembly has a ventilated type disc 10 which is affixed for rotation about a wheel hub generally designated by the reference numeral 40. The disc 40 coacts with a torque absorbing chamber or housing assembly generally designated 20, which is mounted chordally about the disc and affixed to a stationary portion of the of the vehicle (not shown). A brake pellet replenishing reservoir, generally identified at 200, is shown mounted to the top of the torque absorbing chamber 20.

Referring now to FIG. 2, the disc brake assembly 100 is adapted to coact with a ventilated disc 10 which has a pair of oppositely disposed brake surfaces designated 13 and 14 respectively. The disc is affixed for rotation to the wheel hub 40 by means of studs 36 or is formed integrally therewith, as shown. The wheel hub 40 is, in turn, rotatably supported upon a wheel spindle 37 by means including anti-friction bearings 38. The wheel spindle is, in turn, suitably supported relative to the vehicle and may be dirigible in any suitable manner. A tire wheel 39 is also carried by the studs 36 and is held in place by nuts 41. The torque absorbing housing 20 has a depending portion in which an apertured boss is formed for affixing the torque absorbing housing to a stationary portion of the vehicle, as for example, a flange 42 which is mounted to the wheel spindle 37 by suitable means such as bolts 43.

The torque absorbing housing 20 includes a controlled shape outer housing portion 23 which is spaced from and extends across the periphery of the disc 10 and radially inwardly therefrom on opposite sides of the disc. The torque absorbing housing 20 also includes an inner housing portion 25 which is attached in any convenient manner to the outer housing portion 23 to form an inner cavity 24 therebetween. Those skilled in the art will recognize that the inner and outer housing portions 23 and 25 may be optionally formed from one piece. In addition, the inner housing portion 25 and the outer housing portion 23 are each machined with partial annular guide apertures 21a, 21b, 22a and 22b, respectively, on opposite sides of the disc so that the axis of each partial annular guide aperture 21a, 21b, 22a and 22b is approximately perpendicular to each face of the disc brake surfaces 13 and 14, respectively.

A floating collar or sleeve 27 is fitted into the annular guide 21 formed of the partial annular guide apertures 21a and 21b and a secondfloating collar or sleeve 29 is fitted into the annular guide 22 formed of the partial annular guide apertures 22a and 22b. The collars 27 and 29 are biased by springs 15 and 17, mounted in the annular guides 21 and 22, respectively, to touch lightly on the disc brake surfaces 14 and 13, respectively, when the brake system is relaxed or not operating. The collars are further designed to slide along the axis of the guide apertures to permit sliding movement of the collars along th axis of the annular guides to permit the collars 27 and 29 to translate into the disc brake surfaces 14 and 13 respectively to compensate for wear on the collars 27 and 29. The collar 27 is retained in the inner and outer housing portions in the annular guide 21 formed in the inner and outer housing portions, and the collar 29 is retained also in the inner and outer housing portions in the annular guide 22 formed in the inner and outer housing portions.

The cavity 24 is substantially filled with a plurality of brake lining pellets 99 which are either of a spherical or of an interlocking shape. The pellets and collars are designed to be in light contact with the disc brake surfaces and are adapted to be brought into tight frictional engagement with the disc brake surfaces when a piston 50 (FIG. 2) is activated, that is, when braking is desired. The piston 50 is mounted in a cylindrical bore 52 which is formed or machined in the controlled shaped outer housing 23. As shown, the piston 50 has conventional seals 54 and is hydraulically activated. The piston may also be actuated mechanically or by air over hydraulics or in any other suitable manner.

Referring to FIG. 3, the inner housing portion 25 is shown attached to the outer housing 23 by mounting bolt studs 31 and 34. Any other appropriate and convenient attachment means may be used. The outer housing portion is provided with notches 32 and 33, respectively, near the mating surfaces 71 and 72 between the inner and outer housings to provide access to the bolt studs 31 and 34. The collar 29 is shown positioned in the annular guide 22 when the inner housing 25 and the outer housing 23 are assembled (as per FIG. 2).

The replenishing mechanism is generally identified by the reference numeral 300 as shown in FIGS. 2, 4 and 7. The replenishing mechanism 300 is mounted in the outer housing 23. The reservoir 200 is machined, cast or formed into the side of a projection 220 in the outer housing 23 in any suitable manner, as shown in FIG. 2. The reservoir is designed to store a supply of brake lining pellets 99 and has an internal cavity 202 which is designed to enhance the gravity feed of brake lining pellets therethrough. The reservoir may optionally be distantly located, as for example, on the chassis of the vehicle, and connected with an interconnecting flexible tube to the cavity to provide a supply of pellets to the cavity 202 of the reservoir 200. The top 210 of the reservoir 200 is provided with a suitable thread 217 which is engaged by a cap 216 of suitable dimensions. The cap prevents spillage of the brake lining pellets 99 from the reservoir 200 in the event of wheel hop, vehicle roll over, or high angulation road operation. The cap 216 also prevents the ingress of foreign matter which many contaminate or prevent the proper function of the replenishing mechanism 300 of the feeding of the brake lining pellets 99 into assembly 100. The internal cavity 202 has a generally conically shaped bottom end 208. The bottom end 208 is connected to a passage 218 (FIG. 4) which is drilled into the projection 220 so as to interconnect the conically shaped bottom portion 208 with an opening 280. The passage 218 is of suitable size and shape so as to permit the passage by gravity feed of one brake lining pellet 99 at a time therethrough. The opening 280 is drilled or formed in the projection 220 and the outer housing 23 so as to interconnect the passage 218 with a passage 219 which is connected to the cavity 24. A brake lining pellet 99 is advanced through the passage 219 by a magazine pellet feeder 270.

The magazine pellet feeder 270 is mounted in the opening 280. The magazine pellet feeder 270 connects the passages 218 and 219 together so as to permit the advancement of one brake lining 99 at a time through the passages 218 and 219, respectively, and then into the cavity 24. The magazine pellet feeder 270 is aligned in the opening 280 such that a brake lining pellet 99 in the passage 218 is moved by the magazine pellet feeder 270 in the direction 260 as shown in FIG. 4. The magazine pellet feeder 270 then discharges a brake lining pellet 99 tangentially into the passage 219. Thus, the magazine pellet feeder 270 takes a pellet from the passage 218 and is moved by the magazine pellet feeder member 270 to the discharge plane 268 at the passage 219.

Figure 9:
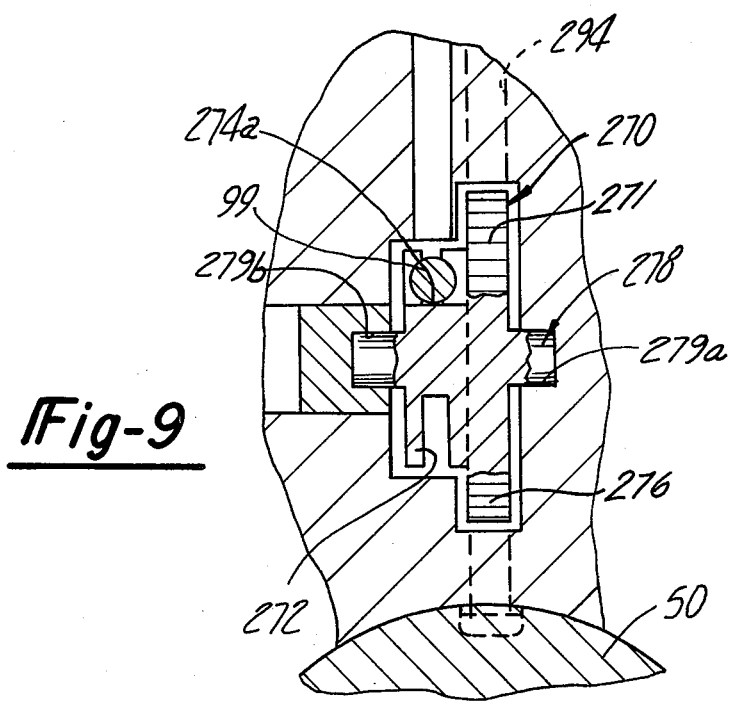
FIG. 9 is an offset sectional view taken along lines 9—9 of FIG. 4.

The magazine pellet feeder 270, as shown in FIGS. 4 and 9, has a feeder disc 272 with a plurality of pellet holder stations or cavities 274a through 274d formed in the periphery of the feeder disc. A second disc 276, larger than the feeder disc 272, is mounted adjacent to one face of the feeder disc 272.

As shown in FIG. 5, the magazine pellet feeder 270 also has a shaft 278 that is fastened perpendicular to the face of the feeder disc 272 and the face of the second disc 276 so as to extend from each face of the discs. The shaft 278 is mounted in the opening 280 in blind bores 279a and 279b in the outer housing 23 so as to be perpendicular to the face of the feeder disc 272 and, therefore, of the second disc 276. Thus, the loading position 266 of the magazine pellet feeder 270 is aligned adjacent to one of the pellet holder stations 274a in the opening 280 and the discharge plane 268 is aligned adjacent another one of the pellet holder stations 274b as shown in FIG. 4.

A pellet stripper member 262 is positioned adjacent to the passage 219 at the discharge plane 268 of the magazine pellet feeder 270 and is mounted in a cavity in the feeder disc 272 as shown in FIGS. 4 and 9. The pellet stripper member 262 is pivotally mounted by a pin to the projection 220 and the outer housing 23 so as to project into the opening 280 and adjacent to the passage 219. A biasing member 264 abuts the stripper member 262 and biases it towards the discharge plane 268 so as to force a brake lining pellet 99, held in the holder station 274c, into the passage 219.

The periphery of the second disc 276 is formed with a plurality of unidirectional teeth 271. The magazine pellet feeder 270 is nonreversing and is actuated in only one direction by a pawl 284, shown in FIG. 4. That is, the pawl has unidirectional saw teeth 275 which engage the teeth 271 on the second disc 276. The pawl 284 is mounted in a passage or bore 294 formed in the projection 220 and the outer housing 23 so as to be perpendicular to the shaft 278 in the blind bores 279a and 279b but offset therefrom, and so as to be perpendicular to the direction of travel of the piston 50 in the cylindrical bore 52. As shown in FIG. 4, the pawl 284 has a tooth insert member 286 mounted in a slot 288 with a biasing member 282 provided between the slot 288 and the tooth insert member 286. The teeth 271 and 275 slip past each other in one direction of travel and engage each other in the other direction of travel, as shown in FIGS. 2 and 4.

Those skilled in the art will recognize that in order to form or drill the passage 219, the opening 280 and the blind bores 279a and 279b, it may be desirable to form the projection 220 separately from the outer housing 23 so as to facilitate the formation or drilling of the aforesaid passage, opening and blind bore. The projection 220 is then fastened by conventional means such as screw threads to the outer housing 23. Any other suitable means to accomplish this end may also be used.

The pawl 284 is biased at an opposite end by a resilient or biasing member 292 which abuts a cap member 293 (FIG. 2) in the passage 294 so as to push the one end of the pawl against a contoured cam ramp 56 (FIGS. 4 and 5) in the piston 50. The teeth 275 of the pawl 284 engage the mating unidirectional teeth 271 on the periphery of the second disc 276 of the magazine pellet feeder 270. Those skilled in the art will recognize that the pawl 284 may be keyed into the passage 294 in any suitable manner such that only one side of the pawl having the tooth insert member coacts with the magazine pellet feeder 270.

The teeth 275 of the pawl 284 are designed to engage the teeth 271 on the magazine pellet feeder 270 only when one end of the pawl 284 is moved in the other direction of travel by the resilient member 292 to maintain the lower end of the pawl 284 in the cam ramp 56. On the other hand, when the brake lining pellets 99 in the inner cavity 24 have been removed through pellet disipation so as to require replenishment, the teeth 271 and 275 slip past each other when the pawl 284 is moved in one direction of travel when the brake piston 50 is moved to squeeze the brake lining pellets 99 in the cavity 24. The teeth 275 and 271 are able to slip past each other because of the unidirectional configuration and because the teeth slip past each other as the tooth insert member 286 is able to resiliently move into the slot 288 against the biasing member 282. Thus, the unidirectional teeth 275 and 271 are engaged to rotate the magazine pellet feeder 270 only after the cam ramp 56 has pushed the one end of the pawl 284 in the one direction of travel and after the brake returns to the neutral position, so that the resilient member 292 may move the one end of the pawl 284 in the other direction of travel against the cam ramp 56. Thus, the tooth insert member is pressed by the biasing member 292 towards the magazine pellet feeder 270 in the direction 260.

In order to prevent any of the brake lining pellets 99 from attempting to pass back into the passage 219 during the braking mode, a pair of spring loaded duct jaws 240a and 240b are provided near the one end 222 of the passage 219. These jaws are pivotally mounted, one opposite the other, in the passage 219. A biasing member 242 is mounted at each end to one of the jaws 240a and 240b such that each jaw is pivotally biased towards the other to close the passage 219 to prevent the ingress of a brake lining pellet 99 from the cavity 24 into the passage 219. These jaws, however, permit the passage of one brake lining pellet 99 therethrough when the magazine pellet feeder 270 feeds a brake lining pellet into the passage 219 during the replenishment mode described above.

When braking is desired, the piston 50 is moved by conventional means such as a hydraulic or mechanical apparatus (not shown) so as to squeeze the brake lining pellets 99 in the cavity 24 to engage the surfaces 13 and 14 of the disc 10. As the piston 50 travels to squeeze the brake lining pellets, the lower end of the pawl 284 remains in contact with the cam ramp 56 by virtue of the action of the biasing member 292 acting on the other end of the pawl. As this occurs, the teeth 275 on the pawl 284 slip past the teeth 271 on the periphery of the second disc 276 of the magazine pellet feeder 270 because the unidirectional teeth cannot engage, as described previously. When the piston 50 is made to return to the neutral position, the contour of the cam ramp 56 allows the biasing member 292 to force the pawl 284 in the other direction of travel to keep the one end of the pawl 284 in contact with the cam ramp 56. This movement of the pawl to travel in the other direction causes the unidirectional teeth 275 on the pawl 284 to engage the unidirectional teeth 271 on the magazine pellet feeder 270 such that this movement rotates the magazine pellet feeder 270 in the direction 260. The rotation of the magazine pellet feeder 270 causes a brake lining pellet 99 to move from the passage 218 into the passage 219 and thence into the inner cavity 24.

The contour depth of the cam ramp 56 and the length of the piston 50 are designed to activate the magazine pellet feeder 270 when the piston returns to the neutral position so that the subsequent action causes refilling of the cavity 24 with brake lining pellets 99. The magazine pellet feeder 270 is also designed to fill the cavity 24 with a brake lining pellet 99 for each pellet that is spent from the cavity 24, but only as required. Since the pellet feeding occurs by spring action during the return portion of the braking cycle, no interference with braking squeeze can occur as a result of the pellet feeding operation.

An alternate embodiment of the pellet feeder mechanism is shown in FIGS. 7 and 8. In this description, similar parts are designated with similar numerals throughout. The replenishing mechanism 300' of this alternate embodiment includes a pellet feeder 170 having a cylindrical threaded screw member 172. The pellet feeder 170 is mounted in a second bore 180 which communicates with the passage 218 and a passage 119. The second bore 180 is parallel to the axis of the passage 119 leading to the internal cavity 24. The passage 119 cuts partly into the second bore 180 and therefore is approximately semi-circular in cross section in the vicinity of the second bore 180, as shown in FIG. 8. The pellet feeder 170 is nonreversing and is designed to move a brake lining pellet from the passage 218 through the passage 119, which is perpendicular to the passage 218. As the pellet feeder 170 rotates, a brake lining pellet remains in the passage 119 by virtue of the relationship of the semi-circular portion of the passage 119 adjacent to the second bore 180. Once past the pellet feeder 170, the passage 119 is fully circular and communicates with the cavity 24 to feed the brake lining pellets 99 therein.

As shown in FIG. 7, the pellet feeder 170 is mounted in the second bore 180 so as to communicate with the passage 119. The pellet feeder 170 has a feeder screw 172 which is rotatably mounted in the second bore 180 such that a brake lining pellet 99 is advanced by the feeder screw 172 from the passage 218 through the passage 119 and thence into the cavity 24. The feeder screw 172 is rotated in one direction only by a pawl 284 identical to the one described in the preferred embodiment. The teeth 275 on the pawl 284 interact with radial unidirectional saw tooth teeth 171 on one end of the feeder screw 172 to move a brake lining pellet 99 in the direction 162 shown in FIG. 7 by rotating the pellet feeder 170 in the direction 160 shown in FIG. 8. The passage 294 is drilled into the projection 220 so that the pawl 284 is perpendicular to the cam ramp 56 and the travel of the piston 50 in the bore 52. The passage 294 is also drilled in the projection 220 so as to be perpendicular to but offset from the central axis of the second bore 180. Furthermore, this alternate embodiment does not require the provision of a pair of jaws 240a and 240b located in the passage 119 to prevent the ingress of a brake lining pellet 99 from the cavity 24, as was described in the passage 219 included in the preferred embodiment.

The operation of the alternate embodiment is the same as the preferred embodiment except that the teeth 275 of the pawl 284 engage the teeth 171 on the feeder screw 172 to rotate the feeder screw 172 in the direction 160 in the second bore so as to move the brake lining pellets 99 in the direction 162 during the brake pellet replenishing mode. A portion of the passage 119 is semi-circular adjacent to the second bore 180 to assure advancing the brake lining pellet 99 through the second bore when the feeder screw is rotated.

MODE OF OPERATION

When the brake is applied, the piston 50 is moved by hydraulic or mechanical means from its predetermined rest or neutral position to squeeze the brake lining pellets 99 contained within the cavity 24 to move into frictional contact with the braking surfaces 13 and 14 on the disc brake 10. The reaction forces imparted to the brake lining pellets 99 are such that when the brake lining pellets move into frictional contact with the braking surfaces the reaction forces are absorbed by the floating collars 27 and 29 which in turn transmit these reaction forces to the inner housing 25 and the outer housing 23. Since the outer housing is rigidly affixed to the vehicle by the flange 42, the reaction forces are thereby absorbed by the vehicle chassis structure. At the same time it is possible that one or more of the brake lining pellets 99 are consumed or spent by heat or abrasion from contacting the braking surfaces 13 and 14.

When the brake is released, the piston 50 is permitted to return to its neutral or rest position. When the increment of travel from the rest position to squeeze the brake lining pellets in the cavity is excessive due to the depletion of the brake lining pellets 99 in the cavity 24, the overtravel is sensed by the pawl 284 in the cam ramp 56 thus activating the magazine pellet feeder 270 in the preferred embodiment to replenish the brake lining pellets 99 into the cavity 24. The biasing member 292 causes one end of the pawl 284 to move along the cam ramp 56 in the piston 50. The teeth 275 on the pawl 284 act to engage the teeth 271 on the magazine pellet feeder 270. The engagement of the teeth 271 and 275 causes the magazine pellet feeder 270 to rotate in the direction 260, thereby advancing the brake lining pellets from the passage 218 to the passage 219. The pellet stripper 262 removes a brake lining pellet 99 from the pellet holder station 274b so that the brake lining pellet is forced into the passage 219. The magazine pellet feeder 270 is designed to replenish the spent brake lining pellets 99 to the inner cavity 24 with an equivalent number of brake lining pellets.

A brake lining pellet 99 is fed into the passage 218 from the reservoir by means of gravity and the conically shaped bottom portion 208 of the reservoir 200. The brake lining pellet 99 drops in the passage 218 such that the brake lining pellet enters the second bore 180. When the brake is released as described above, the brake lining pellet 99 is forced through the second bore 180 by the magazine pellet feeder 270 into the passage 219, by the same action of successive abutting brake lining pellets, past the jaws 240a and 240b and into the cavity 24. Thus, a brake lining pellet 99 is restrained from randomly advancing through the passage 219 by the magazine pellet feeder 270. Once past the jaws 240a and 240b the brake lining pellet falls into the cavity 24 by gravity.

When the brake actuation is stopped, the brake lining pellets and the collars relax to a neutral position which causes the brake lining pellets and collars to be in slight rubbing contact with the braking surfaces of the disc.

In the alternate embodiment, the operation of the brake is similar to the preferred embodiment except that a brake lining pellet 99 from the passage 218 is fed into the second bore 180 and the pellet feeder 170. The pellet feeder 170 and the brake lining pellets then are moved along the feeder screw member 172 by the interaction of the teeth 171 and 275 and by the pawl 284 until the passage 119 is reached. As the brake lining pellet is moved by the feeder screw member 172, into the passage 119, the brake lining pellet 99 is propelled into the cavity 24 by the same action of successive abutting brake lining pellets.

The brake actuation and retraction may be accomplished by any conventional means as, for instance, hydraulic, mechanical, air over hydraulic or by any other suitable means.

The rotor and the inner and outer housing portions may be made from any suitable material as, for example, cast iron or high strength steel. The collars are preferably made of friction resistant material such as bronze.

Although the invention has been described in connection with an automotive vehicle brake system, it also has utility in other types of applications where braking is sought such as for aircraft and other machines.

Thus, many alternatives, modifications and variations will be apparent to those skilled in the art in light of the foregoing description. Accordingly, the present application is intended to embrace all such alternatives, modifications and variations as fall within the spirit and the broad scope of the appended claims.

What I claim is:

1. A brake device having a rotatable disc, said device comprising:
   a stationary support;
   a nonrotating housing mounted to said support and spaced away from and extending across the periphery of said rotatable disc;
   a chamber in said housing extending radially inwardly on opposite sides of said rotatable disc, said chamber having portions defining a cavity and a guide bore extending from said cavity and oriented perpendicular to the face of said rotatable disc;
   a sleeve fitted into said guide bore; a plurality of brake lining pellets stored in said cavity and in said sleeve;
   moving means, mounted in said chamber, for moving said brake lining pellets against said rotatable disc so that the relaive motion between said disc and said nonrotating housing is retarded when said moving means is engaged, said moving means further comprising a piston mounted within said guide bore, and actuating means, mounted in said chamber, for actuating said piston against said brake lining pellets; and
   replenishing means, mounted in said chamber, for replenishing said brake lining pellets in said cavity when at least one of said brake lining pellets is expended, said replenishing means further comprising a pellet storage reservoir mounted on said chamber, and feeding means, disposed in said chamber, for feeding at least one of said brake lining pellets from said pellet storage reservoir into said cavity when at least one of said brake lining pellets is expended;
   wherein said chamber further has portions defining a first passage extending perpendicularly to the axis of said guide bore, a second passage extending from the bottom of said pellet storage reservoir toward said cavity, said second passage communicating with said pellet storage reservoir to pass at least one of said brake lining pellets from said pellet storage reservoir into said second passage, an opening having its axis disposed perpendicular to and communicating with said first passage, said opening further communicating with said second passage and a third passage connecting said opening to said cavity for flow communication therebetween so as to pass at least one of said brake lining pellets therethrough;
   and further wherein said feeding means comprises:
   a feeder member rotatably mounted in said opening, said feeder member having a first disc and a second disc mounted to the face of said first disc, said first disc having a plurality of cavities formed in the periphery of said first disc for holding at least one brake lining pellet therein, said first disc further connecting said second passage with said third passage; and
   rotating means, mounted in said first passage and coupled to said second disc, for rotating said feeder member in one direction of rotation in response to the movement of said piston in said guide bore to advance at least one of said brake lining pellets from said second passage into said opening, into said third passage and into said cavity such that when said piston moves in one direction in said guide bore to squeeze said brake lining pellets in said cavity against said rotatable disc and when at least one of said brake lining pellets is expended, said rotating means rotates said feeder member when said piston moves in the opposite direction so that at least one of said brake lining pellets in said second passage is advanced into one of said cavities in said first disc and said brake lining pellet is rotated by said feeder member into said third passage and into said cavity so as to replenish said cavity with at least one of said brake lining pellets when said rotating means is engaged.

2. The brake device of claim 1 further comprising:
means, mounted in said third passage adjacent to said cavity, for preventing the passage of said brake lining pellets into said third passage when said moving means is engaged and for permitting the passage of at least one brake lining pellet into said cavity from said third passage when said rotating means is engaged.

3. A brake device having a rotatable disc, said device comprising:
a stationary support;
a nonrotating housing mounted to said support and spaced away from and extending across the periphery of said rotatable disc;
a chamber in said housing extending radially inwardly on opposite sides of said rotatable disc, said chamber having portions defining a cavity and a guide bore extending from said cavity and oriented perpendicular to the face of said rotatable disc;
a sleeve fitted into said guide bore;
a plurality of brake lining pellets stored in said cavity and in said sleeve;
moving means, mounted in said chamber, for moving said brake lining pellets against said rotatable disc so that the relative motion between said rotatable disc and said nonrotating housing is retarded when said moving means is engaged, said moving means further comprising a piston mounted within said guide bore, and actuating means, mounted in said chamber, for actuating said piston against said brake lining pellets; and
replenishing means, mounted in said chamber, for replenishing said brake lining pellets in said cavity when at least one of said brake lining pellets is expended, said replenishing means further comprising a pellet storage reservoir mounted on said chamber, and feeding means, disposed in said chamber, for feeding at least one of said brake lining pellets from said reservoir into said cavity when at least one of said brake lining pellets is expended;
wherein said chamber further has portions defining a first passage extending perpendicularly to the axis of said guide bore, a second passage extending from the bottom of said pellet storage reservoir toward said cavity, said second passage communicating with said pellet storage reservoir to pass at least one of said brake lining pellets from said pellet storage reservoir into said second passage, a second bore having its axis normal to said first passage, said second bore having one end connected to said first passage and an opposite end, said second bore further communicating with said second passage and a third passage connecting said opposite end of said second bore with said cavity and parallel to the axis of said second bore for flow communication therebetween so as to pass at least one of said brake lining pellets therethrough;
and further wherein said feeding means comprises:
a pellet feeder member rotatably mounted in said second bore in said housing, said pellet feeder member having a cylindrical body and a helical thread formed on said cylindrical body, said cylindrical body having one end and an opposite end, said one end of said cylindrical body being mounted at said one end of said second bore; and
means, mounted in said first passage and coupled to said one end of said cylindrical body for rotating said pellet feeder member in one direction of rotation in response to the movement of said piston in said guide bore to advance at least one of said brake lining pellets from said second passage into said second bore, into said third passage and into said cavity such that when said piston moves in one direction in said guide bore to squeeze said brake lining pellets in said cavity against said rotatable disc and when at least one of said brake lining pellets is expended, said rotating means rotates said pellet feeder member when said piston moves in the opposite direction so that at least one of said brake lining pellets in said second passage is advanced through said second bore by said helical thread of said pellet feeder member, through said third passage and into said cavity so as to replenish said cavity with at least one of said brake lining pellets when said rotating means is engaged.

* * * * *

UNITED STATES PATENT AND TRADEMARK OFFICE
CERTIFICATE OF CORRECTION

PATENT NO. : 4,429,767
DATED : February 7, 1984
INVENTOR(S) : Robert L. Jenkins

It is certified that error appears in the above-identified patent and that said Letters Patent is hereby corrected as shown below:

Column 3, line 30, delete "in" and insert ---- is ----.

Column 3, line 48, delete "of the".

Column 10, line 9, after "bore;" insert a paragraph.

Column 10, line 14, delete "relaive" and insert ---- relative ----.

In the Abstract

Line 2, delete "toque" and insert ---- torque ----.

Signed and Sealed this

Sixth Day of November 1984

[SEAL]

Attest:

Attesting Officer

GERALD J. MOSSINGHOFF

Commissioner of Patents and Trademarks